US011236830B2

(12) United States Patent
Leger (10) Patent No.: US 11,236,830 B2
(45) Date of Patent: Feb. 1, 2022

(54) SEAL GLANDS FOR BUTTERFLY VALVES (71) Applicant: Fisher Controls International LLC, Marshalltown, IA (US)

(72) Inventor: Bryan Quinn Leger, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 0 days.

(21) Appl. No.: 16/399,509

(22) Filed: Apr. 30, 2019

(65) Prior Publication Data
US 2020/0347939 A1 Nov. 5, 2020

(51) Int. Cl.
F16K 1/22 (2006.01)
F16K 1/226 (2006.01)
F16K 29/00 (2006.01)
F16K 27/02 (2006.01)

(52) U.S. Cl.
CPC ............ F16K 1/2263 (2013.01); F16K 1/222 (2013.01); F16K 1/2261 (2013.01); F16K 27/0218 (2013.01); F16K 29/00 (2013.01)

(58) Field of Classification Search
CPC ........ F16K 1/2263; F16K 1/222; F16K 1/226; F16K 1/2265; F16K 1/2266; F16K 1/228; F16K 27/0218
See application file for complete search history.

(56) References Cited

U.S. PATENT DOCUMENTS

| 3,642,248 A | 2/1972 | Benware |
| 3,986,699 A | 10/1976 | Wucik, Jr. et al. |
| 4,113,268 A | 9/1978 | Simmons et al. |
| 4,306,706 A | 12/1981 | Olansen et al. |

(Continued)

FOREIGN PATENT DOCUMENTS

| CN | 102943885 | 2/2013 |
| GB | 2090380 | 7/1982 |

OTHER PUBLICATIONS

Intellectual Property Office, "Combined Search and Examination Report under Sections 17 and 18(3)," issued in connection with British Patent Application No. GB2005688.3, dated Aug. 17, 2020, 6 pages.

(Continued)

Primary Examiner — Kelsey E Cary
(74) Attorney, Agent, or Firm — Hanley, Flight & Zimmerman, LLC (57) ABSTRACT Example seal glands for butterfly valves are disclosed herein. An example butterfly valve disclosed herein includes a valve body and a valve retainer mounted to the valve body, where the valve body and the valve retainer define a circumferential cavity. The example circumferential cavity includes a first surface substantially perpendicular to a longitudinal axis of a flow path of process fluid through the butterfly valve, a second surface substantially perpendicular to the longitudinal axis, where the second surface offset from the first surface, and a third surface extending between the first surface and the second surface. In the example butterfly valve, the first surface, the second surface, and the third surface enable a seal to translate within the cavity in a direction substantially parallel to the first surface.

20 Claims, 5 Drawing Sheets (56) References Cited

U.S. PATENT DOCUMENTS

| | | | |
|---|---|---|---|
| 4,335,748 A | 6/1982 | Olansen et al. | |
| 4,418,889 A * | 12/1983 | Krause | F16K 5/0673 |
| | | | 251/306 |
| 4,623,121 A * | 11/1986 | Donnelly | F16K 1/2266 |
| | | | 251/305 |
| 4,744,572 A | 5/1988 | Sahba et al. | |
| 5,388,806 A | 2/1995 | Kusmer et al. | |
| 5,535,986 A | 7/1996 | Hutchens et al. | |
| 7,080,820 B2 * | 7/2006 | Eggleston | F16K 1/222 |
| | | | 251/171 |
| 2007/0215834 A1 * | 9/2007 | Helfer | F16K 1/2261 |
| | | | 251/359 |
| 2008/0073612 A1 * | 3/2008 | Day | F16J 15/121 |
| | | | 251/306 |
| 2013/0299729 A1 | 11/2013 | Parrie et al. | |
| 2014/0203201 A1 | 7/2014 | Kinser | |

OTHER PUBLICATIONS

National Institute of Industrial Property, "Preliminary Search Report," issued in connection with French Patent Application No. FR2004304, dated Feb. 15, 2021, 17 pages. English translation included.

* cited by examiner

SEAL GLANDS FOR BUTTERFLY VALVES

FIELD OF THE DISCLOSURE

This disclosure relates generally to butterfly valves and, more particularly, to seal glands for butterfly valves.

BACKGROUND

Control valves (e.g., sliding stem valves, rotary valves, axial flow valves, globe valves, etc.) are commonly used in industrial processes, such as oil and gas pipeline distribution systems and chemical processing plants, to control the flow of process fluids. In some industrial processes, butterfly valves are used to control the flow of process fluids. Butterfly valves are favored in certain applications because they are usually inexpensive to manufacture, relatively lightweight and provide quick and tight shut off. Typically, industrial process conditions, such as pressure conditions, operation temperatures, and the type of process fluids dictate the type of valve components, including the types of butterfly valve seals that may be used.

Some butterfly valves include a circular disc disposed within a valve body to regulate the flow of fluid through the valve. A shaft, which passes through a bore in the valve body, is coupled to the disc to rotate the disc within the valve body. In a closed position, a sealing edge on one side of the disc engages a seal to prevent the flow of fluid through the valve body.

SUMMARY

Butterfly valves are disclosed herein. An example butterfly valve includes a valve body and a valve retainer mounted to the valve body, where the valve body and the valve retainer define a circumferential cavity. The cavity includes a first surface substantially perpendicular to a longitudinal axis of a flow path of process fluid through the butterfly valve, a second surface substantially perpendicular to the longitudinal axis, the second surface offset from the first surface, and a third surface extending between the first surface and the second surface, where the first surface, the second surface, and the third surface enable a seal to translate within the cavity in a direction substantially parallel to the first surface.

Another example butterfly valve disclosed herein includes a valve disc to selectively block an aperture to adjust a fluid flow through the aperture, a valve body including a first circumferential surface surrounding the aperture, and a valve retainer including a second circumferential surface surrounding the aperture, where the second surface is substantially parallel to the first surface. The example butterfly valve further includes a seal to engage the first surface and the second surface within a circumferential cavity defined by the first surface and the second surface, where the seal is to translate in a direction substantially perpendicular to a longitudinal axis of the fluid flow.

Another example butterfly valve disclosed herein includes a valve body defining a first end of a circumferential cavity, where the first end includes a surface substantially perpendicular to a longitudinal axis of a fluid flow path through the butterfly valve. The example butterfly valve further includes a valve retainer mounted to the valve body, where the valve retainer defines a second end of the circumferential cavity, where the cavity is to enable a seal to translate within the circumferential cavity in a direction substantially perpendicular to the longitudinal axis of the fluid flow path. In the example butterfly valve, the first end of the cavity includes a first protrusion to retain the seal, and the second end of the cavity includes a second protrusion to retain the seal.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In a butterfly valve, a valve seal obstructs flow of process fluid around an edge of a valve disc, creating a low-leakage seal around the edge of the valve disc. Some valve seals are housed around an aperture through which process fluid flows, with the valve seal held in place between a valve body and a valve retainer.

In some conventional valve seals, the valve seal is retained within a gland or cavity having surfaces that are oriented toward an axis of rotation of the valve disc. Such valve seal cavities are aligned to be perpendicular to a sealing surface of the valve disc. In other words, the angle of the valve seal cavity is perpendicular to the tangency of a line extending from the disc sealing surface to the centerline of the valve shaft. Such valve seal cavities may be difficult to manufacture, as they require precisely angled surfaces on both the valve body and the valve retainer to form the valve seal cavity. Additionally, valve seal cavities that are angled in alignment with the axis of rotation of the disc restrict movement of the valve seal to a single, angled direction within the valve seal cavity. Often, when a butterfly valve is manufactured, the valve disc may be slightly off-center (e.g., at the outer limit of, or outside of, an acceptable tolerance range). Additionally, the valve disc may be displaced into an off-center position as a result of unbalanced forces on the valve disc. For example, one end of the valve may include packing that applies a force (e.g., in a direction perpendicular to a longitudinal axis of process flow through the valve) on the valve disc. In these cases, there may be forces in a direction substantially perpendicular to the longitudinal axis of the fluid flow path through the valve. Such forces may cause a displacement of the seal within the seal cavity. In some such examples where the seal cavity is angled toward the axis of rotation of the disc, and motion of the seal is restricted to a single direction (e.g., the direction angled toward the axis of rotation of the valve disc) within the seal cavity, the effectiveness of the seal may be limited by the excessive displacement required to account for these in-plane forces.

Example valve seal cavities disclosed herein utilize an optimized geometry that enables translation of the valve seal in a direction substantially perpendicular to the longitudinal axis of the fluid flow path through the valve, thereby enabling the valve seal to maintain positive sealing while compensating for forces applied on the valve disc in a direction substantially perpendicular to the longitudinal axis of the fluid flow path. Such example valve seal cavities disclosed herein allow for tolerance and variation in the valve design while maintaining leak-proof or low-leakage sealing. Further, example valve seal cavities disclosed herein improve manufacturability by utilizing perpendicular surfaces to define the seal cavity, reducing manufacturing cost and complexity, as well as ease of inspection.

As used herein, the term "substantially perpendicular" refers to being perpendicular within ten degrees, and the term "substantially parallel" refers to parallel within ten degrees. As used herein, the term "substantially aligned," when used in reference to two objects (e.g., points, surfaces, etc.) refers to one of the objects being pointed toward the other object, within ten degrees.

Figure 1:
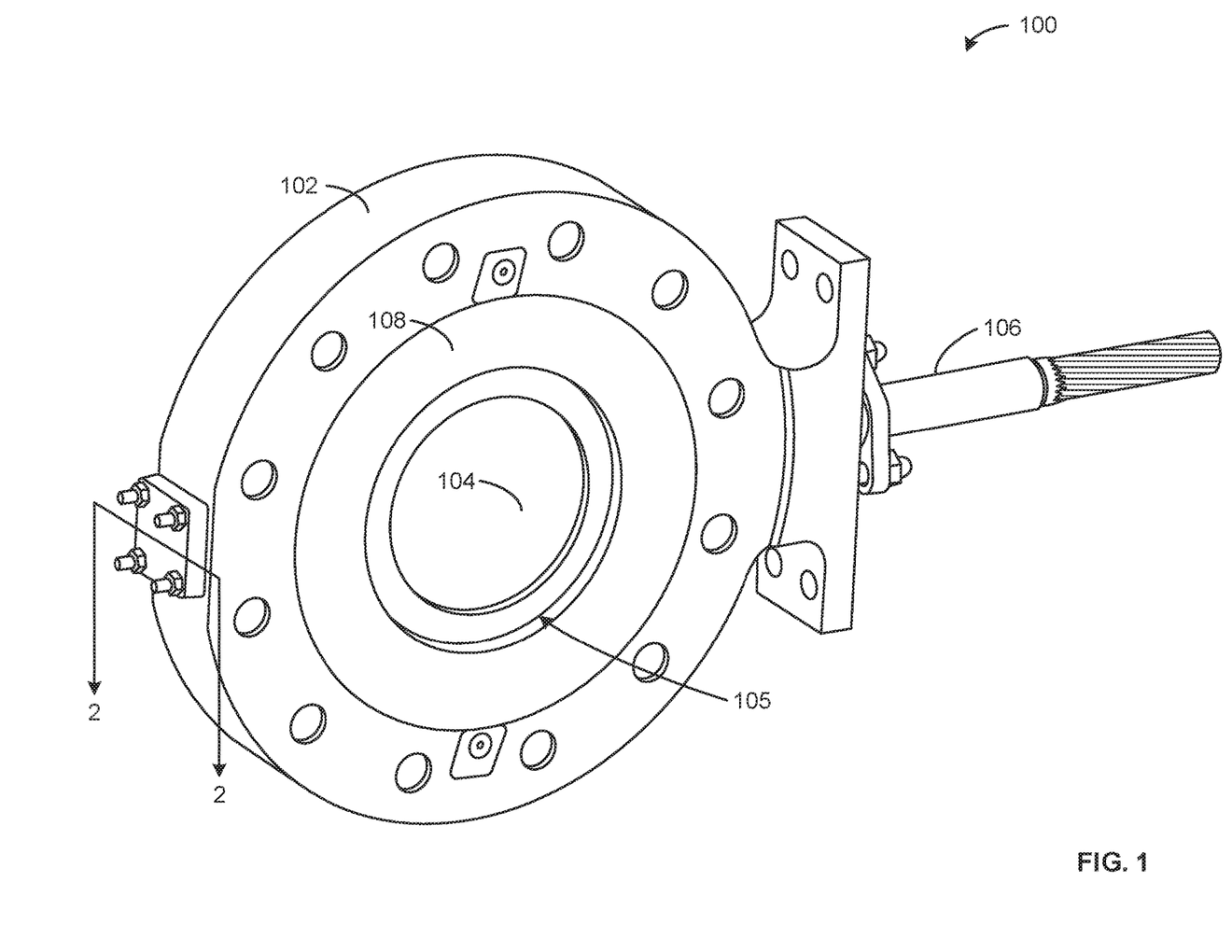
FIG. 1 is an isometric view of an example butterfly valve constructed in accordance with the teachings disclosed herein.

FIG. 1 is an isometric view of an example butterfly valve 100 constructed in accordance with the teachings disclosed herein. The butterfly valve 100 includes an example valve body 102 to attach (e.g., via a plurality of mounting holes on the circumference on the valve body 102) to a pipe to selectively restrict flow of fluid through the butterfly valve 100 and, thus, the pipe.

The butterfly valve 100 includes an example valve disc 104 to selectively block an aperture 105 through which process fluid (e.g., water, gas, oil, etc.) can flow through the butterfly valve 100. In some examples, the valve disc 104 is intended to only prevent flow of the process fluid through the aperture 105 in one direction (e.g., in the direction of flow toward the surface of the valve disc 104 that is visible in FIG. 1). In some examples, the valve disc 104 is additionally or alternatively capable of preventing flow of process fluid in a reverse direction (e.g., backflow).

The valve disc 104 is connected to an example valve shaft 106. The valve shaft 106 can be rotated (e.g., based on a control signal) to cause the valve disc 104 to move between fully closed and fully open positions. In some examples, the valve disc 104 can be actuated to the fully open position to provide maximum flow of process fluid through the aperture 105, or the fully closed position to prevent flow of process fluid through the aperture 105. In some examples, the valve disc 104 can be actuated and held at intermediate positions between the fully closed and fully open positions, thereby throttling flow of process fluid through the aperture 105.

The butterfly valve 100 further includes an example valve retainer 108 mounted to the valve body 102. The valve retainer 108 of the illustrated example of FIG. 1 is mounted to an outer surface of the valve body 102 on the side of the valve body 102 directed toward the incoming process fluid flow path. The valve retainer 108 includes geometry near the edge of the aperture 105 which, in combination with geometry near the edge of the aperture 105 on the valve body 102, defines a circumferential gland or cavity (not visible in FIG. 1). The circumferential cavity defined by the valve body 102 and the valve retainer 108 retains a seal (not visible in FIG. 1) to provide low leakage sealing around the circumference of the valve disc 104 when the valve disc 104 is in the fully closed position.

Figure 2:
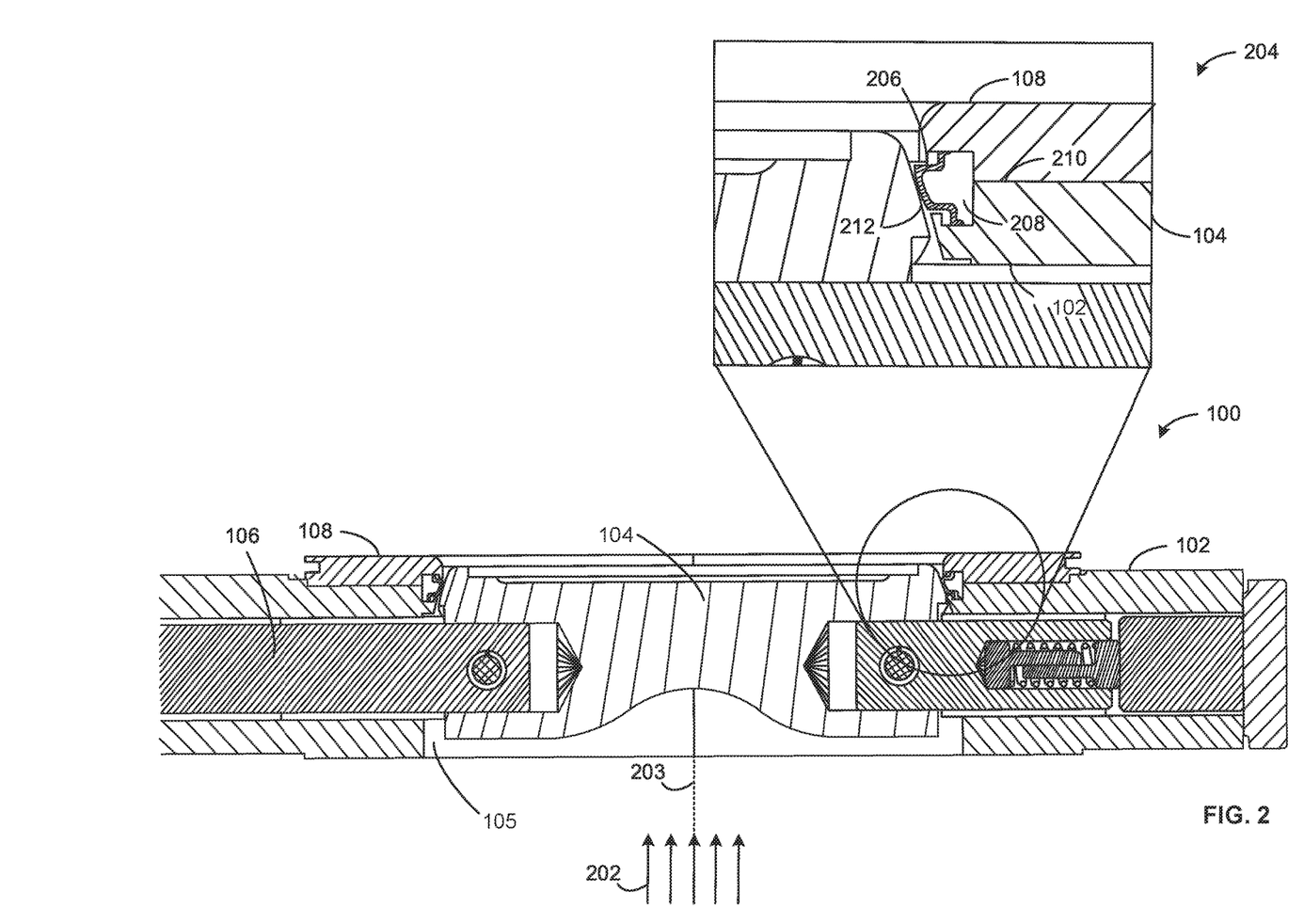
FIG. 2 is a cross-sectional view taken along line 2-2 of the butterfly valve of FIG. 1 including a detailed view of an example seal and an example seal gland or cavity.

FIG. 2 is a cross-sectional view taken along line 2-2 of the butterfly valve 100 of FIG. 1 including a detailed view 204 of an example valve seal 206 and an example seal gland or seal cavity 208. The cross-sectional view of FIG. 2 illustrates the valve body 102 to which the valve retainer 108 is mounted. When the valve disc 104 is in the fully closed position, as illustrated, an example outer surface 212 of the valve disc 104 engages the valve seal 206. When the valve seal 206 is engaged, fluid flow through the aperture 105 is restricted and, in some cases, prevented. An example fluid flow path 202 of process fluid through the aperture 105 of the butterfly valve 100 is indicated by the arrows. The fluid flow path 202 is associated with example longitudinal axis 203.

The detailed view 204 illustrates the example valve seal 206 in the example seal cavity 208. The valve seal 206 of the illustrated example is a circumferential seal that surrounds the aperture 105 of the butterfly valve 100, extending into the aperture 105 but retained via the seal cavity 208. The valve seal 206 is designed to exert sufficient force on the outer surface 212 of the valve disc 104 such that process fluid cannot pass through the aperture 105. In some examples, the valve seal 206 is flexible and capable of stretching to expand an overall diameter of the valve seal 206. In some such examples, when the valve seal 206 is in a stretched, expanded position, the valve seal 206 exerts a compression force around the outer surface 212 that can result in low leakage sealing.

Figure 4:
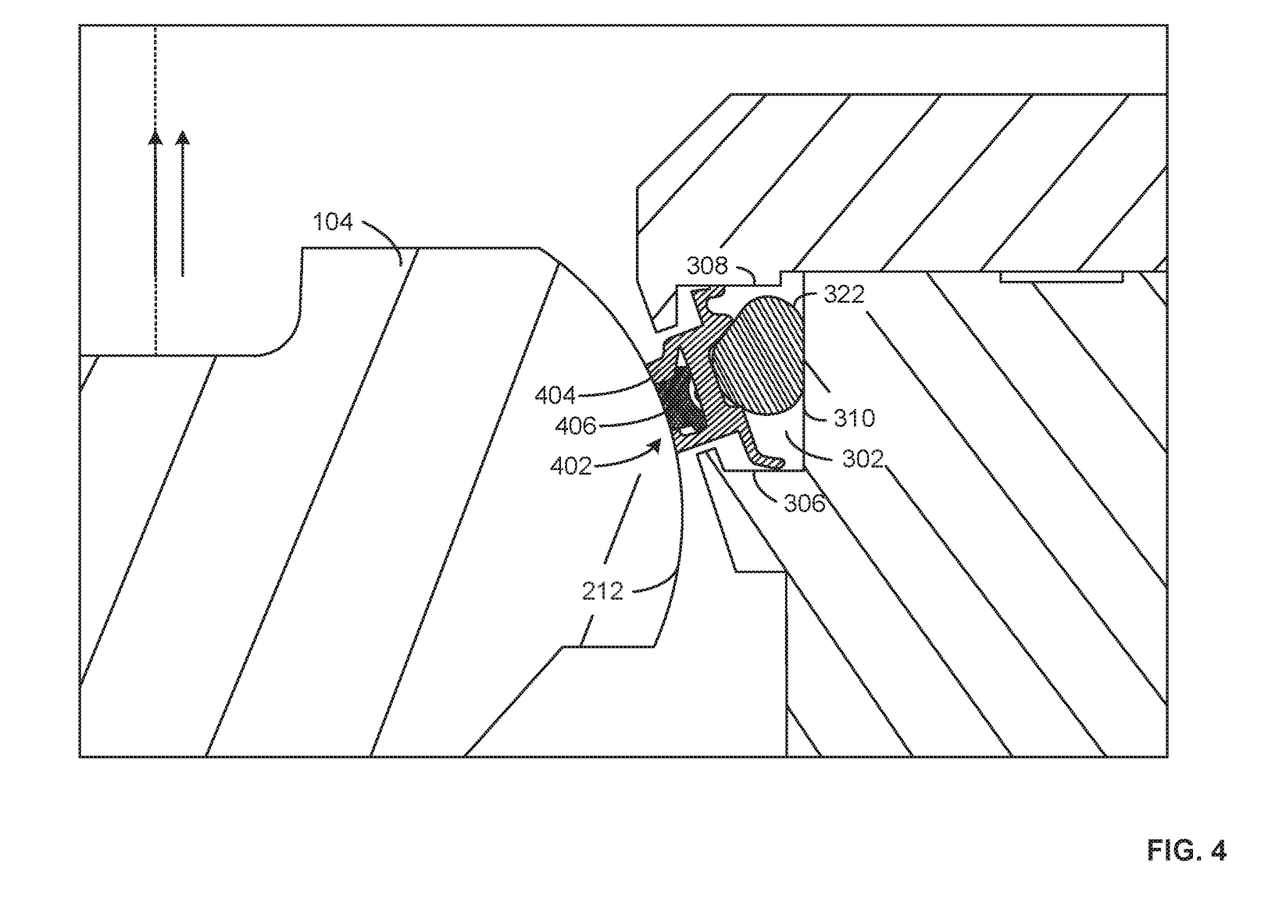
FIG. 4 is a view similar to FIG. 3, but including another example seal within the seal cavity.

In some examples, the valve seal 206 is a soft seal. In some such examples, the valve seal 206 is made of an elastomeric compound, a polymer compound, etc. For example, the valve seal 206 may include polytetrafluoroethylene (PTFE, "Teflon") due to its inert properties and compatibility with numerous potential process fluids. In some examples, the valve seal 206 has low friction properties and high-cycle life capabilities to withstand repeated cycling of the valve disc 104. In some examples, the valve seal 206 may be a fire seal designed to maintain sealing if a high-temperature condition occurs around the butterfly valve 100. In some such examples, the fire seal includes a metallic component (e.g., including stainless steel) to provide a backup seal if a soft seal (e.g., made of an elastomer) melts or otherwise degrades due to the high-temperature condition. FIG. 4 discussed in more detail below illustrates an example fire seal installed in a seal cavity 302.

The example seal cavity 208 of FIG. 2 is defined by surfaces of the valve body 102 and surfaces of the valve retainer 108. During installation, the valve seal 206 can be installed in the seal cavity 208 by placing the valve seal 206 within the groove defined by the valve body 102, and mounting the valve retainer 108 to the valve body 102, thereby defining the seal cavity 208 and capturing the valve seal 206 within the seal cavity 208. In the illustrated example of FIG. 2, the valve body 102 and the valve retainer 108 are joined approximately halfway through a depth of the seal cavity 208, at an example interface 210. While the interface 210 of the illustrated example of FIG. 2 is approximately halfway through the depth of the seal cavity 208, the interface 210 may be located at any depth or location. An example alternative location for the interface 210 is illustrated in FIGS. 3-5A. In some examples, the seal cavity 208 may be entirely defined by the valve body 102 or the valve retainer 108.

Figure 3:
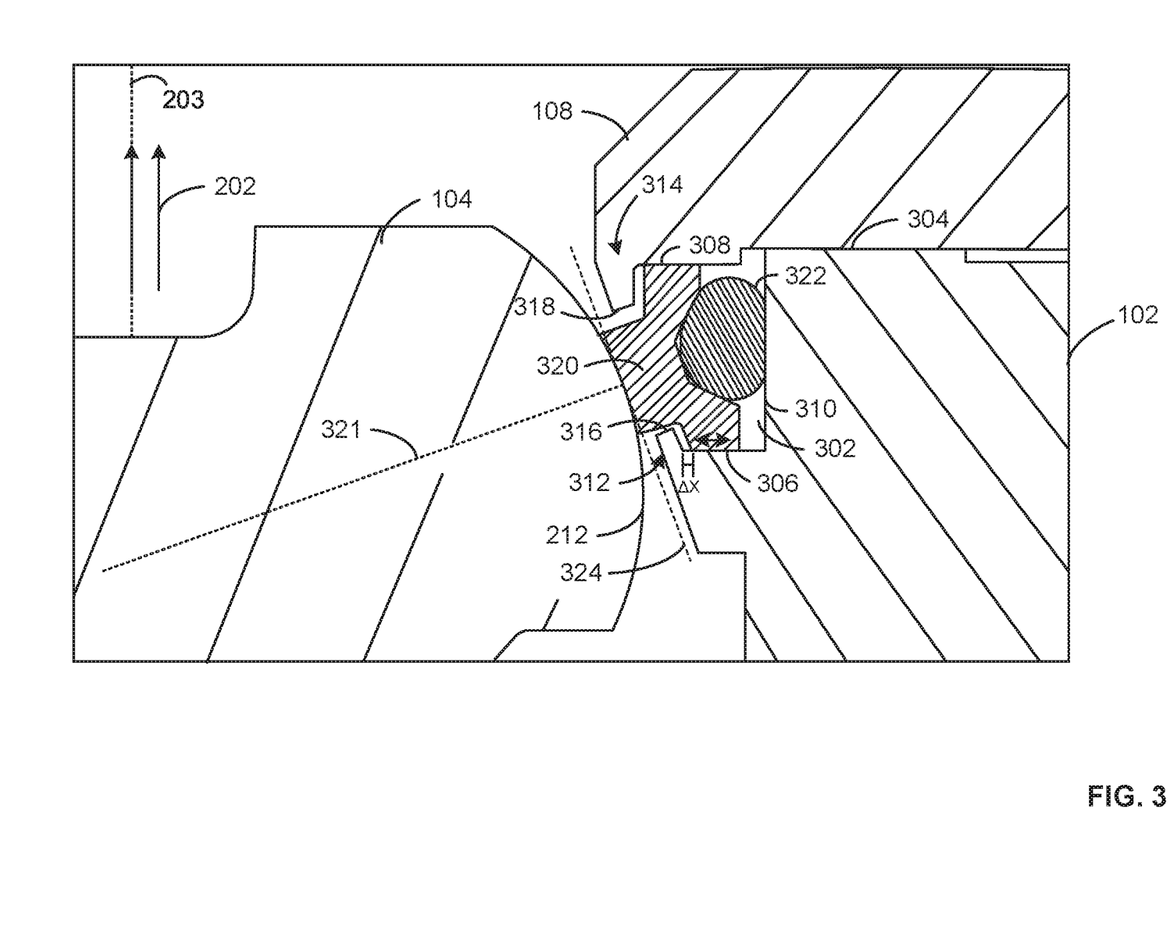
FIG. 3 is an enlarged view similar to the detailed view included in FIG. 2, illustrating an example seal cavity constructed in accordance with the teachings disclosed herein.

FIG. 3 is an enlarged view similar to the detailed view 204 included in FIG. 2, illustrating an example seal cavity 302 constructed in accordance with the teachings disclosed herein. In the illustrated example of FIG. 3, the valve body 102 and the valve retainer 108 define the example seal cavity 302. In the example illustrated in FIG. 3, the valve body 102 and the valve retainer 108 are joined at an example interface 304. The seal cavity 302 of the illustrated example includes an example first surface 306 of the valve body 102, an example second surface 308 of the valve retainer 108, an example third surface 310 of the valve body 102, an example first protrusion 312 of the valve body 102 (e.g., a lower protrusion in the orientation illustrated in FIG. 3), and an example second protrusion 314 (e.g., an upper protrusion in the orientation illustrated in FIG. 3) of the valve retainer 108. In the illustrated example of FIG. 3, the interface 304 is located at an end of the third surface 310. In some examples, the second surface 308 extends to an intersection with the third surface 310 and the second surface 308s is the interface 304 between the valve body 102 and the valve retainer 108. Manufacturing the valve retainer 108 with the second surface 308 being flat (e.g., substantially parallel to the interface 304) improves manufacturability and quality by improving the ability to burnish the second surface 308, which is required to be very smooth in examples where the seal 320 is a metal seal. For example, roller burnishing can be utilized to easily burnish the second surface 308 for a low roughness surface finish, translating into a tighter shutoff capability. With conventional valve seal cavities, the angle of surfaces of the seal cavity make it difficult to precisely roller burnish, and/or to use other techniques such as hand polishing in a lathe. Specifically, a conventional valve seal cavity includes a conical slot within which the valve seal travels, as opposed to a slot with perpendicular surfaces (e.g., such as the first surface 306 and the third surface 310).

The first surface 306 and the second surface 308 of the illustrated example of FIG. 3 are substantially parallel to each other and are substantially perpendicular to the longitudinal axis 203 of the fluid flow path 202 through the butterfly valve 100. The first surface 306 and the second surface 308 of the illustrated example are circumferential and, thus, surround the aperture 105. The first surface 306 is offset from (e.g., spaced apart from) the second surface 308 to accommodate the seal 320. In some examples, only one of the first surface 306 or the second surface 308 is substantially perpendicular to the longitudinal axis 203 of the fluid flow path 202. In some examples, the first surface 306 and/or the second surface 308 include grooves to allow pressure from process fluid to migrate back to an example elastic member 322, which provides sealing against the seal 320 and against an example third surface 310.

The example third surface 310 of the illustrated example of FIG. 3 is substantially perpendicular to the first surface 306 and the second surface 308. The third surface 310 of the illustrated example is also a circumferential surface surrounding the aperture 105. By manufacturing the first, second, and third surfaces 306, 308, 310 as either substantially perpendicular to the longitudinal axis 203 of the direction of the fluid flow path 202 (in the case of the first surface 306 and the second surface 308), or substantially parallel to the direction of the longitudinal axis 203 of the fluid flow path 202 (in the case of the third surface 310), the seal cavity 302 is easier to manufacture and inspect relative to conventional seal cavities. For example, if the seal cavity 302 is machined, the seal cavity 302 as disclosed herein may require fewer and less complicated tools to machine than conventional seal cavities.

FIG. 3 includes an example seal 320 having a different geometry than the valve seal 206 of FIG. 2. Inside the seal cavity 302, the seal 320 extends to the first surface 306 and the second surface 308. The seal 320 of the illustrated example of FIG. 3 extends out of the seal cavity 302 in an example direction 321 perpendicular to an example tangency line 324 of a line extending from the outer surface 212 to the centerline of the valve shaft 106. In some examples, the geometry of the external portion (e.g., the portion extending out of the seal cavity 302) of the seal 320 is complementary to the geometry of the outer surface 212 (e.g., having the same curvature as the outer surface 212) of the valve disc 104, to enable sealing.

The seal 320 of the illustrated example is retained within the seal cavity 302 due to interference between the seal 320 and the first protrusion 312 and the second protrusion 314. The first protrusion 312 of the illustrated includes an example first inner surface 316, and the second protrusion 314 of the illustrated example includes an example second inner surface 318. In the illustrated example, both the first inner surface 316 and the second inner surface 318 are substantially parallel to the direction 321. In some examples, the first inner surface 316 and the second inner surface 318 are not substantially parallel, and are not substantially aligned to the direction 321 (e.g., see the first inner surface 518 and the second inner surface 522 of FIG. 5, described in further detail below). The first inner surface 316 and the second inner surface 318 of the illustrated example oppose surfaces of the seal 320. In some examples, the opposing surfaces of the seal 320, which are offset from the first inner surface 316 and the second inner surface 318, are substantially parallel to the first inner surface 316 and the second inner surface 318. In some examples, the first inner surface 316 and the second inner surface 318 may have any orientation and/or geometry, as long as the first and second inner surfaces 316, 318 are disposed sufficiently toward an internal portion of the seal cavity 302 to prevent the seal 320 from exiting the seal cavity 302.

Unlike conventional seals for butterfly valves that are disposed within a conical or tilted cavity, the seal 320 of the illustrated example is able to translate within the seal cavity 302 in a direction substantially perpendicular to the longitudinal axis 203 of the fluid flow path 202 (e.g., substantially perpendicular the direction indicated by the arrows). For example, if the valve disc 104 moves in a direction substantially perpendicular to the longitudinal axis 203 of the fluid flow path 202, the seal 320 can translate a similar (e.g., equal) amount to offset the potential effects of the movement of the valve disc 104 on quality of sealing. Conversely, in a conventional valve seal disposed within a conical or tilted cavity, the seal is only capable of moving at an angle when the valve disc moves in a direction substantially perpendicular to the longitudinal axis 203 of the fluid flow path 202, and thus a lesser amount of displacement of the disc in the direction substantially perpendicular to the longitudinal axis 203 of the fluid flow path 202 can be sustained by the valve seal without reaching the limit of the valve cavity.

Consequently, in a conventional valve seal disposed within a conical or tilted cavity, a centerline of the disc (e.g., a centerline in a direction corresponding to the longitudinal direction of the flow path) may not be aligned with a centerline of the circumferential seal. In such an example, a first portion of the seal which is being compressed to the limit of its possible displacement will experience excessive interference that can result in crushing effects on the seal, and a second portion of the seal (e.g., at an opposing circumferential position on the seal) will experience little or no interference, resulting in potential leakage. Therefore, by enabling the seal 320 of the illustrated example of FIG. 3 to translate in a direction substantially perpendicular to the longitudinal axis 203 of the fluid flow path 202, the seal cavity 302 allows the seal 320 to track (e.g., follow) the valve disc 104 to maintain consistent and effective sealing around the valve disc 104.

In the illustrated example of FIG. 3, the seal 320 has translated in the direction substantially perpendicular to the longitudinal axis 203 of the fluid flow path 202 by a distance of ΔX, as annotated on FIG. 3. The maximum range of motion of the seal 320 within the seal cavity 302 is limited by the position of the third surface 310.

Adjacent the seal 320 in the seal cavity 302 is an example elastic member 322 to provide a resistive force when the seal 320 is pressed into the seal cavity 302, and to provide sealing to prevent process fluid from leaking from the side of the seal cavity 302 including the first surface 306 to the second side of the seal cavity 302 including the second surface 308. Specifically, process fluid that moves past the first surface 306 and a bottom surface of the seal 320 is unable to move to the other side of the seal cavity 302 including the second surface 308 because the elastic member 322 prevents the leak from spreading to the other side of the seal cavity 302 (and consequently spreading to the other side of the butterfly valve 100). In some examples, the elastic member 322 is an o-ring. In some examples, the seal cavity 302 includes a plurality of o-rings. In some examples, the elastic member 322 is a single torus-shaped member housed between the seal 320 and the third surface 310. The elastic member 322 can be any elastic part that resists movement of the seal 320 into the seal cavity 302 and prevents process fluid from migrating around the seal 320.

FIG. 4 is a view similar to FIG. 3, but including an example alternative seal 402 within the seal cavity 302. The example alternative seal 402 includes an example fire-proof seal portion 404 and an example polymer seal portion 406. The alternative seal 402 of the illustrated example can be utilized in environments where there is a potential of a high-temperature condition (e.g., due to a fire) in the vicinity surrounding the butterfly valve 100. The alternative seal 402 includes the fire-proof seal portion 404 to serve as a primary sealing component in the event of a high-temperature condition that causes the polymer seal portion 406 to become deformed or less effective. In some examples, the fire-proof seal portion 404 includes a metallic material (e.g., stainless steel, 316 steel alloy, etc.). In some examples, the polymer seal portion 406 includes PTFE.

The polymer seal portion 406 of the illustrated example is captured within an internal cavity of the fire-proof seal portion 404. In normal operation, absent a high-temperature condition, the polymer seal portion 406 provides a tight seal against the outer surface 212 of the valve disc 104. In some examples, during normal operation (absent a high-temperature condition), the fire-proof seal portion 404 provides less sealing on the outer surface 212 than the polymer seal portion 406. In some examples, the fire-proof seal portion 404 less sealing due to the seal being formed by metal-on-metal contact on the outer surface 212 of the valve disc than the polymer seal portion 406. The fire-proof seal portion 404 provides sealing against the outer surface 212 of the valve disc 104 to prevent process fluid from flowing into the seal cavity 302 and around the alternative seal 402.

In the illustrated example of FIG. 4, the elastic member 322 is deformed to conform to geometry of an internal surface (e.g., the surface facing the third surface 310) of the alternative seal 402. As illustrated in FIG. 4, the elastic member 322 has multiple points of contact with the internal surface of the alternative seal 402, thereby preventing a fluid flow path in multiple locations for any process fluid that leaks into the seal cavity 302.

Figure 5A:
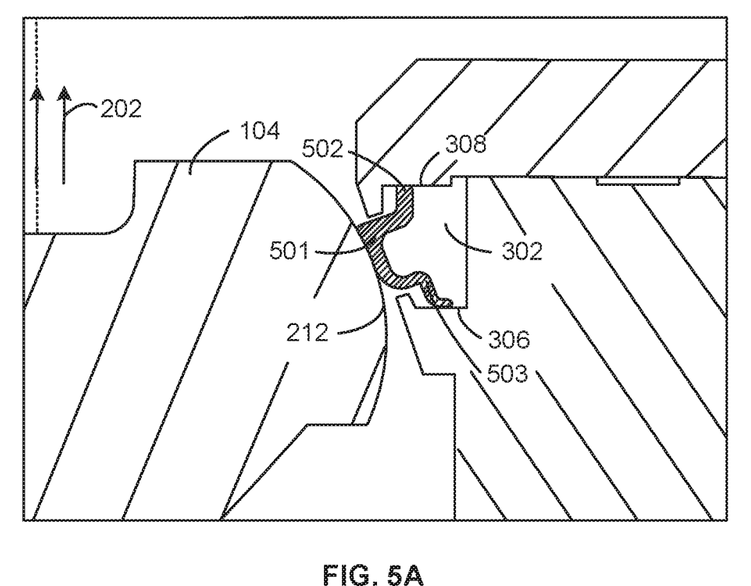
FIG. 5A is a view similar to FIG. 3, but including another example seal within the seal cavity.
Figure 5B:
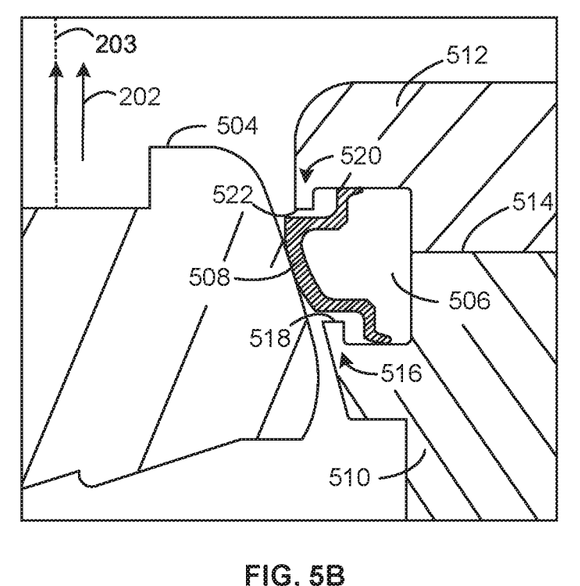
FIG. 5B is a view similar to FIG. 3, but including another example valve disc, another example seal cavity, and another example seal.

FIG. 5A is a view similar to FIG. 3, but including another example seal 501 within the seal cavity 302. The example seal 501 has a smaller overall volume than the seal 320 of FIG. 3, but similarly includes surfaces to contact the first surface 306 and the second surface 308 and to translate thereon, as well as a surface to engage the outer surface 212 of the valve disc 104. The example seal 501 of FIG. 5A includes an example relatively thicker portion 502 oriented toward the second surface 308, and an example relatively thinner portion 503 oriented toward the first surface 306. The relatively thicker portion 502 has a greater thickness than the relatively thinner portion 503. In some examples, the relatively thicker portion 502 enables the seal 501 to resist crushing in a direction corresponding to the fluid flow path 202 and to support sealing against the outer surface 212 as the valve disc 104 attempts to move in the direction of the fluid flow path 202 (e.g., due to shaft bending and part clearances). Further, in some examples the relatively thicker portion 502 can resist radial dilation caused by pressure from the outer surface 212 of the valve disc 104. In some examples, the relatively thinner portion 503 of the seal 501 enables the seal 501 to be elastically compressed by the seal cavity 302.

FIG. 5B is a view similar to FIG. 3, but including another example valve disc 504, another example seal cavity 506, and another example seal 508. FIG. 5B includes another valve body 510 and another valve retainer 512, which are joined at an example interface 514. The valve body 510 includes an example first protrusion 516 to partially define the seal cavity 506. Unlike the first protrusion 312 illustrated in FIG. 3, the first protrusion 516 includes a first inner surface 518 that is substantially perpendicular to the longitudinal axis 203 of the fluid flow path 202. Similarly, the valve retainer 512 includes an example second protrusion 520 including a second inner surface 522 that is substantially perpendicular to the longitudinal axis 203 of the fluid flow path 202. In some examples, the second protrusion 520 may be chamfered, as in the second protrusion 314 of FIG. 3, to prevent potential interference between the second protrusion 520 and the valve disc 504. For example, if an inner diameter of the valve retainer 512 were reduced (e.g., to achieve a particular flow characteristics) the second protrusion 520 can be chamfered to avoid interference with the valve disc 504 during rotation of the valve disc 504.

From the foregoing, it will be appreciated that example butterfly valve glands or seal cavities have been disclosed that are capable of enabling a seal to translate in a direction substantially perpendicular to a longitudinal axis of a fluid flow path, thereby enabling tolerance or variation in valve design while maintaining low leakage sealing between the valve disc and the seal. Further, the valve seal cavities disclosed herein are easier to manufacture and inspect.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A butterfly valve comprising:
   a valve body; and
   a valve retainer mounted to the valve body, the valve body and the valve retainer defining a circumferential cavity, the cavity including:
      a first surface substantially perpendicular to a longitudinal axis of a flow path of process fluid through the butterfly valve;
      a second surface substantially perpendicular to the longitudinal axis, the second surface offset from the first surface; and
      a third surface extending between the first surface and the second surface, wherein the first surface, the second surface, and the third surface enable a seal to translate within the cavity in a direction substantially parallel to the first surface, wherein the seal includes a first seal portion and a second seal portion, the second seal portion positioned within an internal cavity of the first seal portion, an elastic member to seal against the seal and the third surface, the elastic member to prevent process fluid leakage from the first surface of the circumferential cavity to the second surface of the circumferential cavity,
      wherein the first seal portion includes a first contact portion to contact the first surface of the circumferential cavity and a second contact portion to contact the second surface of the circumferential cavity, the second contact portion thinner than the first contact portion, the second contact portion to permit elastic compression of the seal by the first and second surfaces of the circumferential cavity.

2. The butterfly valve of claim 1, wherein the first surface is a surface of the valve retainer, and the second surface and the third surfaces are surfaces of the valve body.

3. The butterfly valve of claim 1, wherein the third surface is substantially perpendicular to the first surface and the second surface.

4. The butterfly valve of claim 1, further including a protrusion on the valve retainer and a protrusion on the valve body to retain the seal within the cavity.

5. The butterfly valve of claim 4, further including a valve disc to block fluid from traveling through the flow path, wherein the protrusions include inner surfaces substantially angled toward an axis of rotation of the valve disc.

6. The butterfly valve of claim 5, wherein the inner surfaces of the protrusions are substantially parallel.

7. A butterfly valve comprising:
   a valve disc to selectively block an aperture to adjust a fluid flow through the aperture;
   a valve body including a first circumferential surface surrounding the aperture;
   a valve retainer including a second circumferential surface surrounding the aperture, the second surface substantially parallel to the first surface;
   a seal to engage the first surface and the second surface within a circumferential cavity defined by the first surface and the second surface, the seal to translate in a direction substantially perpendicular to a longitudinal axis of the fluid flow, the seal to include a first seal portion and a second seal portion, the second seal portion positioned within an internal cavity of the first seal portion, the first seal portion including a first contact portion to contact the first surface of the circumferential cavity and a second contact portion to contact the second surface of the circumferential cavity, the second contact portion thinner than the first contact portion, the second contact portion to permit elastic compression of the seal by the first and second surfaces of the circumferential cavity; and
   an elastic member to seal against the seal and a third surface extending between the first surface and the second surface, the elastic member to prevent process fluid leakage from the first surface of the circumferential cavity to the second surface of the circumferential cavity.

8. The butterfly valve of claim 7, wherein the first surface is substantially perpendicular to the longitudinal axis.

9. The butterfly valve of claim 7, wherein the valve retainer further includes a first protrusion to retain the seal within the circumferential cavity.

10. The butterfly valve of claim 9, wherein the first protrusion includes a first inner surface opposing and substantially parallel to a surface of the seal, the first inner surface angled relative to the first circumferential surface.

11. The butterfly valve of claim 10, wherein the first inner surface is substantially perpendicular to a line extending from an outer surface of the valve disc to a centerline of a valve shaft.

12. The butterfly valve of claim 11, wherein the valve body further includes a second protrusion to retain the seal within the circumferential cavity, the second protrusion including a second inner surface opposing and substantially parallel to the first inner surface.

13. The butterfly valve of claim 7, wherein the third surface defines a maximum range of motion of the seal within the circumferential cavity.

14. A butterfly valve comprising:
   a valve body defining a first end of a circumferential cavity, the first end including a surface substantially perpendicular to a longitudinal axis of a fluid flow path through the butterfly valve;
   a valve retainer mounted to the valve body, the valve retainer defining a second end of the circumferential cavity, the cavity to enable a seal to translate within the circumferential cavity in a direction substantially perpendicular to the longitudinal axis of the fluid flow path, a first protrusion to retain the seal being adjacent the first end of the cavity, and a second protrusion to retain the seal being adjacent the second end of the cavity, the seal to include a first seal portion and a second seal portion, the second seal portion positioned within an internal cavity of the first seal portion, the first seal portion includes a first contact portion to contact a first surface of the circumferential cavity and a second contact portion to contact a second surface of the circumferential cavity, the second contact portion thinner than the first contact portion, the second contact portion to permit elastic compression of the seal by the first and second surfaces of the circumferential cavity; and
   an elastic member to seal against the seal and a third surface of the circumferential cavity, the third surface extending between the first surface of the circumferential cavity and the second surface of the circumferential cavity, the elastic member to prevent process fluid leakage from the first surface to the second surface.

15. The butterfly valve of claim 14, wherein the second surface is substantially parallel to the first surface.

16. The butterfly valve of claim 15, wherein the third surface is substantially perpendicular to the first surface.

17. The butterfly valve of claim 16, wherein the third surface defines a maximum distance over which the seal can translate in the direction substantially perpendicular to the longitudinal axis.

18. The butterfly valve of claim 14, wherein the first and second protrusions retain the seal within the circumferential cavity.

19. The butterfly valve of claim 18, wherein the first protrusion and the second protrusion are substantially parallel.

20. The butterfly valve of claim 18, wherein the first protrusion and the second protrusion are substantially perpendicular to a line extending from an outer surface of a valve disc to a centerline of a valve shaft.

* * * * *